United States Patent Office 3,577,394
Patented May 4, 1971

3,577,394
2-CHLOROETHYL 2-CYANOACRYLATE AND COMPOSITIONS THEREOF
Joseph K. Harrington, Edina, Minn., assignor to Minnesota Mining and Manufacturing Company, St. Paul, Minn.
No Drawing. Filed Sept. 27, 1968, Ser. No. 763,378
Int. Cl. C08f 3/74
U.S. Cl. 260—78.4  3 Claims

ABSTRACT OF THE DISCLOSURE

A useful cyanoacrylate monomer, 2-chloroethyl 2-cyanoacrylate, is provided, having utility in adhesive compositions. A process for its preparation is described.

BACKGROUND OF THE INVENTION

Field of the invention

This invention relates to a monomer, 2-chloroethyl 2-cyanoacrylate, which polymerizes to form a coating or adhesive. Rapidly polymerizing compositions comprising this monomer are particularly useful as adhesives. A process for the preparation of this monomer is described.

Prior art

Alkyl 2-cyanoacrylates, as well as cyclohexyl and phenyl 2-cyanoacrylates, and adhesive compositions utilizing these monomers, are described in several patents including U.S. 2,794,788; 2,467,927; 2,467,926 and 2,467,-251. Substituted alkyl 2-cyanoacrylates which have been reported include alkoxyalkyl and thioalkoxyalkyl 2-cyanoacrylates as described in U.S. Pat. 2,784,215. However, there appears to be no report of a chloroalkyl 2-cyanoacrylate.

The alkyl 2-cyanoacrylates, and particularly methyl 2-cyanoacrylate, have been commercially successful as the major components of adhesive compositions. They have many desirable properties. For example, they set rapidly, forming strong bonds in minutes or even seconds. No mixing with additional components is necessary. They have compatibility with a wide range of materials. The adhesive bonds cure without appreciable shrinkage at room temperature. And yet they have certain disadvantages. Heat resistance is limited by the melting point of the polymer (about 165° C. for the polymer of methyl 2-cyanoacrylate. In addition, the lower alkyl monomers which have been exploited in commercial compositions are extremely expensive.

Another important limitation of these compounds and their compositions is their odor. It is known in the art that compositions containing methyl 2-cyanoacrylate have a pungent, unpleasant odor and produce a mild lachrymatory and irritant effect on the mucous membranes of the nose and eyes. This is a significant disadvantage of the prior art compounds. Aside from the unpleasant odor, special ventilation procedures and apparatus to remove irritating vapors are necessary in many situations where the adhesive compositions of the prior art are used. Methyl and ethyl 2-cyanoacrylate are much more volatile than 2-chloroethyl 2-cyanoacrylate.

It is the aim of this invention to provide an adhesive monomer which can be utilized in improved adhesive compositions, a process for its preparation and said compositions.

The compound of this invention sets rapidly to form strong bonds with a wide range of materials. Its adhesive bonds cure at room temperature without appreciable shrinkage. In addition, the compound of this invention provides adhesive bonds with good heat resistance and good stability in water. The compound of the present invention is much less irritating and unpleasant to the eyes, nose and throat, particularly under ambient conditions, than methyl or ethyl 2-cyanoacrylate. Compositions utilizing the monomer of the present invention are significantly improved over compositions of closely comparable prior art monomers.

DETAILED DESCRIPTION OF THE INVENTION

The compound of this invention, 2-chloroethyl 2-cyanoacrylate, is represented by the following formula:

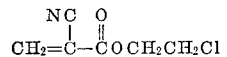

The compound is a clear, colorless liquid boiling at 114–116° C./2.5 to 3.0 mm. Its structure has been established by infrared spectral analysis and elemental analysis as well as its method of synthesis. The boiling points of methyl (about 50° C. at 3 mm.) and ethyl (about 55° C. at 3 mm.) 2-cyanoacrylate are significantly lower than the boiling point of 2-chloroethyl 2-cyanoacrylate.

The usual method of preparation of the compound of the present invention is comprised of two steps. The first step is the acid- or base-catalyzed condensation reaction of 2-chloro-ethyl 2-cyanoacetate with formaldehyde or polymers thereof such as paraformaldehyde, excepting aqueous solutions of formaldehyde as typified by formalin. This step yields a polymer. The second step involves thermal depolymerization of said polymer.

A preferred method of preparation is described below, In the first step of the reaction a catalyst is required which is a mixture of an organic (e.g. formic, acetic, propionic, trifluoroacetic, and the like) or inorganic (e.g. hydrochloric, sulfuric, and the like) acid with an acidic salt of an alkyl primary or secondary amine. Both of these components must be present during the reaction. The amount of catalyst mixture used is not critical, but a range of about 0.5 percent to 5 percent by weight is preferred. To be effective, the catalytic mixture should have a pH of about 5 or less when the exact quantities of the catalyst mixture components to be used in a given reaction are dissolved in 25 ml. of water. If the catalyst mixture is to include an acid which is not readily soluble in water, such as some organic acids, then the pH is measured in 25 ml. of an ethanol-water mixture and subsequently is corrected as described in the Journal of the American Chemical Society, 75, 576 (1953).

The reaction medium may be any suitable inert solvent capable of forming an azeotrope with water, such as benzene, toluene, etc. When the reaction is complete, the distillation of water terminates. The polymer layer is separated from the benzene layer by decantation. The polymer is then dissolved in hot acetone and filtered. The acetone is removed before commencing the thermal depolymerization step.

The second step, thermal depolymerization, may be carried out by techniques well known in the art, such as those described in U.S. Pats. 2,721,858; 2,763,677 and 2,784,215, and illustrated by the example described below.

Other methods for the preparation of 2-cyanoacrylate esters known in the art, such as those described in U.S. Pats. 2,721,858 and 2,763,677, may also be employed for the preparation of the monomer of the present invention.

The preparation of 2-chloroethyl 2-cyanoacetate is carried out by acid-catalyzed esterification of cyanoacetic acid with 2-chloroethanol. After the water produced as a by-product has been removed azeotropically, the acetate is separated from the acid catalyst by filtration or extraction, and fractionally distilled.

The adhesive bonds formed by the monomer of this invention show better stability to moisture when aged in water, that is they degrade more slowly, than the adhesive bonds formed by methyl and ethyl 2-cyanoacrylate.

The adhesive compositions of this invention are mixtures comprising the monomer, one or more stabilizers and polymerization inhibitors and optionally one or more plasticizers, accelerators or thickening agents. The use of such adjuvants to form adhesive compositions is well known to the art. Polymerization inhibitors and stabilizers which may be used in the compositions of this invention include hydroquinone and its methyl and ethyl ethers, catechol, nitrohydroquinone, sulfur dioxide, nitric oxide, boron trifluoride and the like. Combinations of sulfur dioxide (100 to 1000 p.p.m.) and the monomethyl ether of hydroquinone (10 to 100 p.p.m.) are presently preferred. Representative thickening agents are e.g. polymethylmethacrylate, as described in U.S. Pats. 2,765,332 and 3,282,773. Suitable plasticizers are generally esters and are described, for example, in U.S. Pat. 2,784,127.

When employing the compositions embodying this invention, the monomeric material is merely spread in a thin film on a surface to be bonded, and the other element or elements to be used in forming the laminate are merely placed into contact with the monomeric film. The monomer polymerizes rapidly without the application of heat and without any polymerization catalyst within seconds to give a strongly adherent bond which is highly resistant to shear. Thus the compositions embodying this invention possess the anomalous characteristic of being stable for many weeks or months in bulk without showing substantial polymerization, and still polymerizing in a few seconds when spread into a thin film, even though the film still contains stabilizer and/or polymerization inhibitor. The adhesive compositions embodying this invention are characterized by a very low change in volume during polymerization.

The compositions utilizing the monomer of the present invention may also contain substantial amounts of other copolymerizable 2 - cyanoacrylate esters, including alkyl and substituted alkyl esters, in order to obtain modification of properties, and such compositions are contemplated by and within the spirit of this invention.

The following examples will further illustrate the manner of practicing the invention. It will be understood, however, that these examples are included to illustrate certain embodiments of the invention and are not intended to limit the scope of the invention as defined herein unless specifically indicated.

EXAMPLE 1

2-chloroethyl cyanoacetate

Cyanoacetic acid (450 g., 5.3 moles), 2-chloroethanol (425 g., 5.3 moles), p-toluenesulfonic acid hydrate (3 g.) and benzene (500 ml.) are heated to reflux. The mixture is refluxed for about 20 hours while collecting water and benzene in a Barrett trap. The product is placed in a separatory funnel containing diethyl ether (1 liter) and washed with 5 percent sodium bicarbonate solution until the pH of the ether solution is about 8. The solvent solution is washed with a saturated sodium chloride solution (500 ml.) and evaporated in vacuo to remove the solvents.

The product is distilled at about 8–10 mm. pressure and the fraction boiling from 133 to 137° C. collected. Redistillation gives 360 g. of product, B.P. 134° C. at 8 mm.

*Analysis.*—Calculated for $C_5H_6ClNO_2$ (percent): C, 40.7; H, 4.1. Found (percent): C, 40.5; H, 4.0.

EXAMPLE 2

Piperidine hydrochloride (1.0 g.), glacial acetic acid (5 drops), paraformaldehyde (39 g., 1.3 mole), 2-chloroethyl 2-cyanoacetate (147.6 g., 1.0 mole) and benzene (500 ml.) are heated to reflux and refluxed for 15 hours. The reaction mixture is cooled ambiently and the benzene distilled off in vacuo. The polymer is dissolved in acetone (300 ml.) under reflux and the hot solution is filtered. Tricresyl phosphate (73 g.) is added, and the acetone is distilled off in vacuo.

Polyphosphoric acid (5.0 g.) and pyrogallol (0.5 g.) are added with stirring. The reaction mixture is heated to 150° C. and then the temperature is gradually raised to 170° C. as the product, 2-chloroethyl 2-cyanoacrylate, distills over under high vacuum. Sulfur dioxide gas is bled into the product at the condensation head.

The product is redistilled to give product of 98 percent purity, B.P. 96–98° C. at 0.3 mm.

*Analysis.*—Calculated for $C_6H_6ClNO_2$ (percent): C, 45.3; H, 3.8. Found (percent): C, 45.2; H, 3.8.

Thus, by means of this invention a new and improved 2-cyanocrylate ester is readily prepared, and this material finds increased utility in adhesive applications to give high strength bonds of improved hydrolytic stability. In addition, this monomer offers a major advantage over the unsubstituted lower alkyl esters in having a lower volatility and decreased odor and lachrymatory effect.

What is claimed is:

1. A compound of the formula

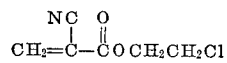

2. An adhesive composition comprising 2-chloroethyl 2 - cyanoacrylate and one or more polymerization inhibitors.

3. An adhesive composition comprising 2-chloroethyl 2-cyanoacrylate, one or more polymerization inhibitors and one or more adjuvants selected from the group consisting of plasticizers, accelerators and thickening agents.

References Cited

UNITED STATES PATENTS

| | | | |
|---|---|---|---|
| 2,768,109 | 10/1956 | Coover | 260—88.7 |
| 2,784,127 | 3/1957 | Joyner et al. | 260—88.7 |
| 3,275,462 | 9/1966 | Strobel et al. | 260—465.4 |
| 3,355,482 | 11/1967 | Coover et al. | 260—465.4 |

HARRY WONG, JR., *Primary Examiner*

U.S. Cl. X.R.

260—465.4, 881